(12) United States Patent
Kingham et al.

(10) Patent No.: US 10,332,641 B2
(45) Date of Patent: Jun. 25, 2019

(54) HYBRID MAGNET FOR USE IN FUSION REACTORS

(71) Applicant: Tokamak Energy Ltd, Oxfordshire (GB)

(72) Inventors: David Kingham, Oxfordshire (GB); Mikhail Gryaznevich, Oxfordshire (GB)

(73) Assignee: TOKAMAK ENERGY LTD, Oxfordshire (GB)

( * ) Notice: Subject to any disclaimer, the term of this patent is extended or adjusted under 35 U.S.C. 154(b) by 152 days.

(21) Appl. No.: 15/503,453

(22) PCT Filed: Jul. 24, 2015

(86) PCT No.: PCT/GB2015/052142
§ 371 (c)(1),
(2) Date: Feb. 13, 2017

(87) PCT Pub. No.: WO2016/027058
PCT Pub. Date: Feb. 25, 2016

(65) Prior Publication Data
US 2017/0236600 A1   Aug. 17, 2017

(30) Foreign Application Priority Data
Aug. 18, 2014 (GB) .................................. 1414637.7

(51) Int. Cl.
*G21B 1/05* (2006.01)
*G21B 1/17* (2006.01)
(Continued)

(52) U.S. Cl.
CPC ............... *G21B 1/057* (2013.01); *G21B 1/17* (2013.01); *H01F 6/06* (2013.01); *H05H 1/12* (2013.01);
(Continued)

(58) Field of Classification Search
CPC .. G21B 1/057; G21B 1/17; H01F 6/06; H05H 1/12; H05H 1/16
(Continued)

(56) References Cited

U.S. PATENT DOCUMENTS

| 2004/0040737 | A1 | 3/2004 | Kikuchi | |
| 2016/0049229 | A1* | 2/2016 | Bromberg | .......... H01F 6/06 505/211 |

FOREIGN PATENT DOCUMENTS

| GB | 983528 | 2/1965 |
| WO | 2013030554 A1 | 3/2013 |

OTHER PUBLICATIONS

British Search Report for corresponding application GB1414637.7; Report dated Jan. 29, 2015.
(Continued)

*Primary Examiner* — Jack W Keith
*Assistant Examiner* — Daniel Wasil
(74) *Attorney, Agent, or Firm* — Cantor Colburn LLP

(57) ABSTRACT

A toroidal field coil for generating a toroidal magnetic field in a nuclear fusion reactor comprising a toroidal plasma chamber having a central column. The toroidal field coil comprises a portion passing through the central column. The portion passing through the central chamber comprises: ●a low temperature superconductor, LTS, layer (21) formed from LTS; ●a high temperature superconductor, HTS, layer (22) formed from HTS and located radially outward of the LTS layer. ●a non-superconducting conductive layer (23) formed from electrically conducting, non-superconducting material and located radially outward of the HTS and LTS layers.

12 Claims, 1 Drawing Sheet

(51) Int. Cl.
H05H 1/12 (2006.01)
H05H 1/16 (2006.01)
H01F 6/06 (2006.01)

(52) U.S. Cl.
CPC .............. *H05H 1/16* (2013.01); *Y02E 30/122* (2013.01); *Y02E 30/126* (2013.01); *Y02E 30/128* (2013.01)

(58) Field of Classification Search
USPC ........................................................ 376/137
See application file for complete search history.

(56) References Cited

OTHER PUBLICATIONS

H. W. Weijers, "High Field Magnets with HTS Conductors", IEEE Transactions on Applied Superconductivity, vol. 30, No. 3, Jun. 2010, XP-002745161.

International Search Report for corresponding application PCT/GB2015/052142 filed Jul. 24, 2015; dated Oct. 9, 2015.

Jinxing Zheng, "Concept Design of Hybrid Superconducting Magnet for CFETR Tokamak Reactor", 2013 IEEE 25th Symposium on Fusion Engineering, Jun. 10, 2013, pp. 1-6, XP032507015.

Nagato Yanagi, "Cryogenic Stability of LTS/HTS Hybrid Conductors", IEEE Transactions on Applied Superconductivity, vol. 17, No. 2, Jun. 2007, pp. 2486-2489.

Ramesh Gupta, "Hybrid High Field Cosine Theta Accelerator Magnet R&D with Second Generation HTS", Applied Superconductivity Conference, Aug. 15, 2014, pp. 1-4, XP002745159.

Sukjin Choi, "A Study on Prototype Hybrid (LTS/HTS) Magnet for NMR Application", Journal of Magnetics, 16(3), 312-317 (2011), XP-002745160.

Written Opinion of the International Searching Authority for corresponding application PCT/GB2015/052142 filed Jul. 24, 2015; dated Oct. 9, 2015.

* cited by examiner

HYBRID MAGNET FOR USE IN FUSION REACTORS

TECHNICAL FIELD

The present invention relates to a hybrid magnet for use in a fusion reactor. In particular, though not exclusively, the invention relates to a hybrid magnet for use in the central column of a compact spherical tokamak reactor.

BACKGROUND

The challenge of producing fusion power is hugely complex. Fusion neutrons are produced when a deuterium-tritium (D-T) or deuterium-deuterium (D-D) plasma becomes very hot so that the nuclei fuse together, releasing energetic neutrons. To date, the most promising way of achieving this is to use a tokamak; in the conventional tokamak approach to fusion (as embodied by ITER), the plasma needs to have high confinement time, high temperature, and high density to optimise this process.

A tokamak features a combination of strong toroidal magnetic field $B_T$, high plasma current $I_p$ and, usually, a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a habit of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and build costs reduced.

WO 2013/030554 describes a compact spherical tokamak for use as a neutron source or energy source. An important consideration in the design of spherical tokamaks is the protection of reactor components from the high neutron flux generated by the fusion reaction. This is of particular importance on small tokamaks as the neutron flux (i.e. neutron flow per unit area) will in general be higher due to the smaller surface area-to-volume ratio of the plasma vessel.

SUMMARY

According to an aspect of the present invention, there is provided a toroidal field coil for generating a toroidal magnetic field in a nuclear fusion reactor comprising a toroidal plasma chamber having a central column. The toroidal field coil comprises a portion passing through the central column. The portion passing through the central chamber comprises:
  a low temperature superconductor, LTS, layer (21) formed from LTS;
  a high temperature superconductor, HTS, layer (22) formed from HTS and located radially outward of the LTS layer.
  a non-superconducting conductive layer (23) formed from electrically conducting, non-superconducting material and located radially outward of the HTS and LTS layers.

According to a second aspect of the present invention, there is provided nuclear fusion reactor comprising a plasma chamber having a central column and the toroidal field coil of the first aspect.

Further embodiments of the first and second aspects are set out in the appended claims.

DETAILED DESCRIPTION

Figure 1:
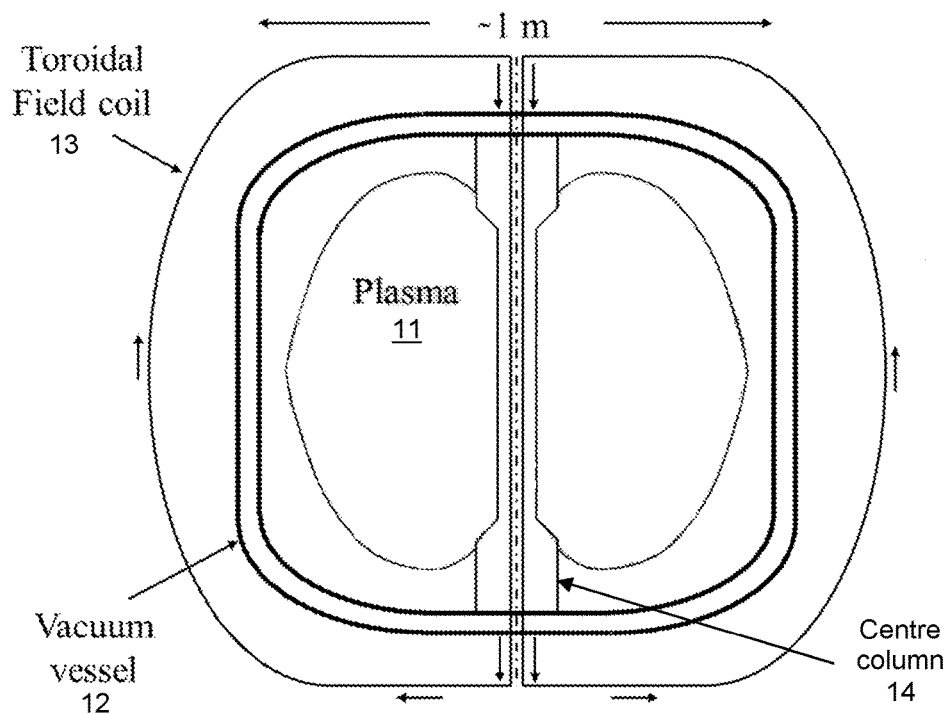
FIG. 1 is a schematic diagram of a spherical tokamak reactor.

The present application is based on a very compact form of the tokamak, and employs a range of innovative features, including use of High Temperature Superconducting magnets. The 'Efficient Compact Fusion Reactor' (ECFR) is intended to provide a compact fusion power plant. FIG. 1 is a schematic diagram of such a reactor. The plasma (11) is contained within a vacuum vessel (12) by the magnetic fields generated by a toroidal field coil (13) and a poloidal field coil (not shown). The toroidal field coil runs down a central column (14) in the centre of the plasma chamber.

A drawback of the ST is that the limited space in the central column prohibits installation of the substantial shielding necessary to protect the central windings in a neutron environment—so conventional toroidal field windings, and conventional central solenoids (used to induce and maintain the plasma currents) are not practical. Although power plants based on the ST have been designed (using solid copper centre posts with limited shielding, the post being changed every year or so when damaged by neutrons), these have high energy dissipation in the centre column due to the relatively high resistivity of warm copper, requiring a large device for electricity production to become economical.

Superconducting materials may be used for the central core, but such materials are vulnerable to damage from neutrons, and may fail catastrophically if enough damage accumulates that the material no longer superconducts. There is therefore a trade-off between the overall size of the central core, the cross sectional area of the superconducting material (which is related to the maximum current that the superconductor can carry), and the thickness of the shielding.

The magnetic field which can be generated by a superconductor is limited to the critical field of that superconductor (which varies with temperature). Above the critical field, the material will no longer act as a superconductor. If there is current flowing through the superconductor when it ceases to superconduct, the sudden increase in resistance and the sudden change in magnetic field can cause considerable damage. Damage to the superconductor (e.g. by neutrons) will tend to reduce the critical field.

In order to ensure that the reactor is as compact as possible (which allows greater efficiency), the thickness of shielding should be reduced as much as possible, while still maintaining adequate protection for the other components. Minimising the distance between the plasma and the field coils allows a higher magnetic field in the plasma with a lower current in the coils.

In order to provide higher magnetic fields for the toroidal field, and hence improve the efficiency of the spherical tokamak reactor, a new structure for the toroidal field coils is proposed below. This approach uses a "hybrid" electromagnet within at least the central column of the reactor. The hybrid electromagnet comprises an outer non-superconducting conductive layer (hereafter referred to as a "non-superconducting layer" for brevity) and an inner superconducting layer. This allows for a higher field than the use of a coil comprising only superconductor, as the non-superconducting layer can carry high current in a much higher magnetic field than the inner superconducting layers, and the field strength increases towards the outside of the hybrid magnet. Suitable materials for the non-superconducting conductive layer are those with high conductivity, a relatively high neutron cross section, and resistance to neutron damage. A number of metals satisfy these criteria, and examples such as copper, beryllium, or aluminum are particularly suitable. Non-superconducting conductive material should be taken to encompass materials which are not superconducting at achievable temperatures, i.e. it does not exclude materials which only superconduct at temperatures below those which could be achieved by liquid helium cooling.

As well as allowing for higher magnetic field strength, providing a non-superconducting layer outside the superconductor core of the magnet also shields the superconductor from neutron damage. The non-superconducting layer is made from a material far more resistant to neutron damage than superconducting materials, and is less likely to fail catastrophically if too much damage occurs (since the layer is not superconducting, it will not cause the magnet to suddenly quench if the resistance increases).

The hybrid magnet can be further expanded by including both low temperature superconductor (LTS) and high temperature superconductor (HTS), with the LTS forming the inner layer, the HTS forming a central layer, and non-superconducting material forming the outer layer. LTS generally has a lower critical magnetic field than HTS, and the effect of neutron heating is more severe there is a greater risk of quenching, and the energy cost of removing excess heat is greater. Therefore, including LTS in the core of the triple-hybrid magnet provides similar advantages to including HTS in the core of a double-hybrid magnet.

The HTS will also act to shield the LTS from neutrons which pass through the shielding and the non-superconducting layer, further reducing the shielding required. In fact, there is evidence that some HTS compounds (e.g. ReBCO) may actually have increased critical current after moderate neutron exposure.

In order to prevent current flow between each layer, insulating layers should be provided between the conducting layers. This is particularly important between the non-superconducting layer and the outermost superconducting layer. Due to the high currents involved, vacuum gaps are preferred to provide the insulation.

There are further advantages relating to the cooling of the magnets. If vacuum gaps are provided between each layer of the magnet, then any heat absorption by the superconducting materials is primarily radiative (disregarding heat produced within the superconducting material itself). The rate of radiative heat flow between successive magnet layers (or between the outer magnet layer and the shielding) is proportional to the difference between the fourth power of the temperature of the layers (i.e. the heat flow from layer A to layer B is proportional to $T_A^4 - T_B^4$, where the temperature is in Kelvin). Therefore, the closer the temperature of successive layers, the less cooling is required. The low temperature superconductor will typically be cooled to liquid helium temperatures (i.e. below 4 K), preferably below 2 K. The high temperature superconductor will typically be cooled to 20 K-50 K, but in the case of BSSCO 2212 may be cooled to about 10 K. Since the optimal configuration for both magnetic field strength and neutron absorption involves having materials requiring a lower temperature towards the centre of the hybrid magnet, this provides a gradual stepping down of the temperature through the magnet. Alternatively, the HTS can be cooled to substantially the same temperature as the LTS, practically eliminating radiative heating, and ensuring that the HTS takes the brunt of any external heating which occurs. The non-superconducting layer may also be cooled to reduce radiative heating of the superconductor layers, but excessive cooling may not result in an overall increase in efficiency as the energy required to cool the non-superconducting layer significantly below room temperature is unlikely to be offset by the reduced resistance of the non-superconducting layer or the reduced need to cool the superconductor. Alternatively, or additionally, a radiation shield may be provided between the HTS layer and the non-superconducting layer, with the radiation shield being cooled to an intermediate temperature between the HTS temperature and the temperature of the non-superconducting layer. The cooling of the intermediate layer could be by liquid nitrogen, resulting in a temperature in the region of 80 K. There may be a temperature gradient across the non-superconducting layer, but with suitable design of a cooling/heat recovery system this should not have any negative impact.

Figure 2:
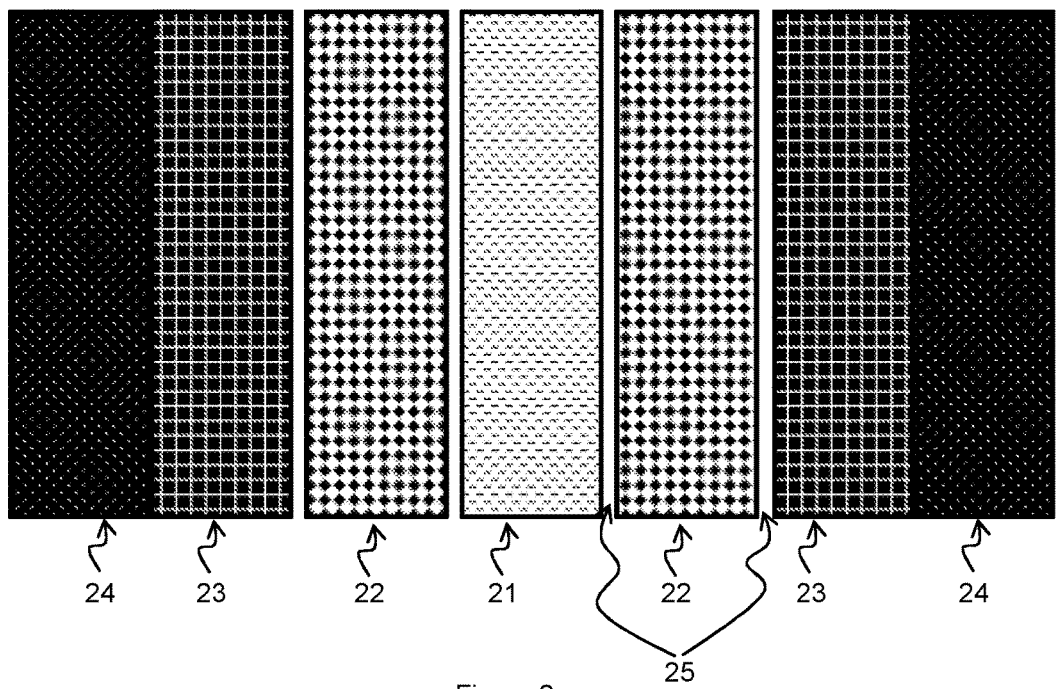
FIG. 2 is a cross section of a central column of a fusion reactor according to an embodiment.

FIG. 2 shows a cross section of a central column for a spherical tokamak reactor comprising an exemplary hybrid magnet. The figure is not to scale, and structural and cooling components are not shown. The layers of the magnet are, moving from the centre outwards, low temperature superconductor 21, high temperature superconductor 22, and a non-superconducting conductive layer 23. Between the hybrid magnet and the plasma is neutron shielding 24. There are vacuum gaps 25 between the LTS and HTS, and between the HTS and non-superconducting layers. In this example, no vacuum gap is provided between the non-superconducting layer and the shielding as the non-superconducting material and shielding will be at similar temperature, and so such a gap would not provide any benefit.

The hybrid magnet structure may be most advantageously used in the central column of the tokamak, as it provides a compact way of achieving very high magnetic fields, and reduces the thickness of shielding needed compared to a purely superconductor based magnet. The use of a hybrid magnet therefore both allows for a higher magnetic field, and a thinner centre column compared to conventional spherical tokamaks, which increases the efficiency of the spherical tokamak reactor. The hybrid magnet may also be used in the other parts of the toroidal field coil in order to provide a stronger field, but the compactness of the hybrid magnet is less important in this application. The hybrid magnet could be used for the poloidal field, but it is likely that the increase in efficiency from a stronger poloidal field would not offset the higher energy usage of the hybrid magnet.

Examples of suitable superconducting materials include, but are not limited to:

HTS: ReBCO (YBCO or GdBCO), BSSCO 2212, BSSCO 2223, or $MgB_2$

LTS: niobium tin or niobium titanium

Multiple layers of superconductor may be used, e.g. the field coil may comprise two different LTS layers, and two different HTS layers, with an outer non-superconducting layer. In order to achieve the advantages noted above, the critical field of the superconducting layers should increase from the centre of the magnet outwards. Equally, the advantages noted above can be achieved to a lesser extent by the use of a "double-hybrid" field coil comprising an inner layer of HTS or LTS, and an outer layer of a non-superconducting conductive material.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A toroidal field coil for generating a toroidal magnetic field in a nuclear fusion reactor comprising a toroidal plasma chamber having a central column, the toroidal field coil comprising a portion which comprises:
   a low temperature superconductor (LTS) layer formed from LTS material;
   a high temperature superconductor (HTS) layer formed from HTS material and located radially outward of the LTS layer;
   a non-superconducting conductive layer formed from electrically conducting, non-superconducting material and located radially outward of the HTS and LTS layers.

2. A toroidal field coil according to claim 1, and comprising an insulating layer located between the HTS layer and the non-superconducting conductive layer.

3. A toroidal field coil according to claim 2, and comprising a further insulating layer located between the LTS layer and the HTS layer.

4. A toroidal field coil according to claim 1, and comprising a plurality of HTS layers and/or a plurality of LTS layers, each HTS and/or LTS layer being made from a different material, wherein every HTS layer is located radially outwards of every LTS layer, and the non-superconducting conductive layer is located radially outwards of all HTS and LTS layers.

5. A toroidal field coil according to claim 4, and comprising further insulating layers located between each pair of adjacent HTS and/or LTS layers.

6. A toroidal field coil according to claim 1, wherein the insulating layer(s) comprises a region of vacuum.

7. A toroidal field coil according to claim 1, wherein the non-superconducting conductive material comprises copper, beryllium and/or aluminium.

8. A nuclear fusion reactor comprising a plasma chamber having a central column and the toroidal field coil of claim 1, wherein the portion of the toroidal field coil passes through said central column.

9. The fusion reactor of claim 8, comprising four or more toroidal field coils.

10. The fusion reactor of claim 8, configured to confine plasma in the plasma chamber with a major radius of the confined plasma of 1.5 m, preferably less than 1.0 m, more preferably less than 0.5 m.

11. The fusion reactor of claim 8, which reactor has an aspect ratio of 2.5 or less and is preferably a spherical tokamak reactor with aspect ratio of 2.0 or less.

12. The fusion reactor of claim 8, in which shielding is provided around the central column in order to reduce or eliminate damage from neutrons.

* * * * *